Patented Apr. 10, 1923.

1,451,489

UNITED STATES PATENT OFFICE.

OLIVER W. BROWN AND CLYDE O. HENKE, OF BLOOMINGTON, INDIANA.

PROCESS FOR THE MANUFACTURE OF AZOXY, AZO, HYDRAZO, AND AMINO COMPOUNDS.

No Drawing.   Application filed September 21, 1921.   Serial No. 502,245.

*To all whom it may concern:*

Be it known that we, OLIVER W. BROWN and CLYDE O. HENKE, citizens of the United States, residing at Bloomington, in the county of Monroe and State of Indiana, have invented a new and useful Process for the Manufacture of Azoxy, Azo, Hydrazo, and Amino Compounds, of which the following is a specification.

Our invention relates to a process for the manufacture of azoxy, azo, hydrazo, and amino compounds from nitro compounds.

It is the object of our invention to produce azoxy, azo, and hydrazo compounds in commercial proportions by a simple reduction of nitro compounds, in a simple, inexpensive, and rapid manner; to produce amino compounds more rapidly and more inexpensively than has hitherto been done; and to produce these compounds without reducing the yield by the formation of other compounds, as cyclo compounds, methane, or ammonia, some of which may contaminate the final products.

It is well known that azoxy, azo, hydrazo, and amino compounds are produced by the chemical or electrolytic reduction of nitro compounds; and that amino compounds (with little or none of the compounds named) may also be produced by passing a mixture of hydrogen gas and a volatile nitro compound over certain finely divided metal catalysts, of which nickel, cobalt, copper, iron, platinum, osmium, and iridium have been used. To manufacture azoxy, azo, hydrazo, and amino compounds by the methods commonly used requires the employment of costly reducing agents and apparatus. When amino compounds are prepared by passing a volatilized nitro compound mixed with hydrogen gas over active nickel, the product obtained is impure, because the reactions which occur lead to the formation of cyclo compounds and to the decomposition of the nitro compound into methane and ammonia. When copper, iron, cobalt, or any of the platinum-group metals are employed as the catalysts in the production of an amine by passing a volatile nitro compound mixed with hydrogen over it, the process is relatively slow, making the cost of the apparatus great for a given production.

It has also been known that if the catalysts above named, and especially platinum, are mixed with lead, the lead acts as a catalyst-poison, and prevents the catalytic action from taking place. Hence lead or anything containing lead has been considered inimical to the catalysts.

In accordance with our invention, the vapors of a nitro compound mixed with hydrogen or with a gas containing hydrogen are passed over and forced into intimate contact with a catalyst consisting of finely divided lead, bismuth, or thallium, at a temperature sufficient to produce the desired reaction. Under this treatment, the nitro compound is reduced to an azoxy, azo, hydrazo, or amino compounds, or more generally to a mixture of two or more of these compounds. The range of temperature which we find produces commercial quantities of these products varies from about 200° C. to about 360° C., being in some instances higher than the melting points of the metal catalysts. In general, the proportionate amount of the amino compound produced increases with an increase of temperature within the limits named; while a decrease of temperature within such limits increases the proportionate amounts of the azoxy, azo, and hydrazo compounds produced.

We find that by using lead, bismuth, and thallium as catalysts, the reduction of the nitro compound occurs much more rapidly than when the previously known catalysts are used, and in addition causes the production of the intermediate compounds—the azoxy, azo, and hydrazo compounds—instead of carrying substantially the entire reduction to the final amino compound. Because of this gain in speed, we are able to reduce a larger quantity of the nitro compounds for a given size of apparatus, thus reducing the cost; and because of the production of the intermediate reduction compounds we get a product of greater value, as these intermediate reduction compounds command a higher price than the amino compounds.

We believe that this desirable result from the use of thallium, lead, or bismuth as the catalyst is due to their atomic weights. These three elements have successive atomic weights, of 204.0, 207.20, and 208.0, respectively (O=16.00). These metals all lie in the odd series of the fourth long period of the periodic table in groups III, IV, and V, respectively, as is well known; and their atomic weights all lie between 204 and 208 inclusive, according to the most recent determinations with which we are familiar.

To illustrate the practical operation of our process:

When we passed the vapor of nitrobenzene mixed with an excess of hydrogen gas over a catalyst heated to 290° C. and containing finely divided lead which was prepared by reducing red lead in a current of hydrogen, we obtained a reduction of substantially all the nitrobenzene, and the final product contained 78% of aniline (amidobenzene), and 21% of azobenzene mixed with small amounts of azoxybenzene and hydrazobenzene. Similarly, when we pass the vapors of nitrobenzene mixed with an excess of hydrogen gas at a temperature of 290° C. over a lead catalyst prepared by reducing an amorphous litharge in a current of hydrogen, 24.1% of the nitrobenzene was recovered as azobenzene, with small admixtures of azoxybenzene and hydrazobenzene, and 53.6% as aniline. When we passed these same vapors and hydrogen gas at the same temperature over a catalyst prepared by reducing a heavy litharge in hydrogen, 55.4% of the nitrobenzene used was converted into azobenzene, with small amounts of azoxybenzene and hydrazobenzene, while a smaller proportion of the nitrobenzene was recovered as aniline.

When we passed nitrobenzene vapors mixed with several times the theoretical quantity of hydrogen necessary for its complete reduction, over a bismuth catalyst at 230° C., 92% of the nitrobenzene was converted into azobenzene, with small admixtures of azoxybenzene and hydrazobenzene, and 4.4% into aniline. When the same thing was done, save that the temperature was at 240° C., the amount of azobenzene and its associate intermediate reduction products was reduced to 89.2% of the nitrobenzene, while the amount of aniline was increased to 9.1%. When the temperature was increased to 300° C., the yield of azobenzene and its associate intermediate reduction products was reduced to 29.5%, and that of aniline was increased to 65.2%. Thus an increase in temperature assists in the reduction, and increases the proportion of the final reduction product, which here is aniline; while a decrease in the temperature causes the amount of intermediate reduction products to be increased. The intermediate reduction products need not be separated, as they can be sold commercially as a mixture, because they constitute a ready source for benzidine. Of these intermediate reduction products, the azo products, such as azobenzene, form the largest proportion; indeed, the hydrazobenzene is not stable, and reverts in the presence of air and moisture to azobenzene.

The relative proportions of aniline and of the intermediate reduction products depends, apparently, partly upon the way in which the catalyst is prepared, and the compound used for preparing it. We have not discovered the reasons for these differences, which are illustrated by the results obtained when different lead catalysts are used as described above.

We prefer to prepare our lead-containing catalysts by the reduction of either an oxide, hydroxide, or carbonate of lead in a current of hydrogen. The lead catalyst may be prepared, however, from other substances containing lead or its compounds, and in other ways than by the use of a hydrogen-containing gas as a reducing agent. The lead catalyst, or the lead compound from which it is made, may be used in a pure condition, or may be mixed with some other substance which will act as a support, such as pumice stone, asbestos, aluminum oxide, magnesium sulphate, or a finely divided metal which will not alloy with the metal catalyst under the condition encountered in the process.

One method of preparing a bismuth-containing catalyst is to precipitate a bismuth nitrate solution with ammonium hydroxide, filter the precipitate obtained, and after drying reduce such precipitate in hydrogen at a temperature between 250° and 350° C.

In carrying out our process, it is not necessary to use hydrogen in a pure condition. It may be used either in a pure condition, or mixed with water vapor or other gas which is relatively inert under the conditions obtained in our process. The gas mixture may be brought into contact with or forced through the catalysts in any suitable way; and the proportion of the nitro-compound vapor to the hydrogen-containing gas may be varied within wide limits, though it is essential that there be an excess of hydrogen in order to obtain the reduction of substantially all the original nitro compound.

We claim as our invention:

1. The process of producing azoxy, azo, hydrazo, and amino compounds, which consists in subjecting a nitro compound in the gaseous state and mixed with gas containing hydrogen to the action of a heated catalyst containing a finely divided metal having an atomic weight between that of thallium and that of bismuth inclusive, to form one or more of the desired azoxy, azo, hydrazo, and amino compounds.

2. The process of producing azoxy, azo, hydrazo, and amino compounds, which consists in subjecting a nitro compound in the gaseous state and mixed with hydrogen to the action of a heated catalyst containing a finely divided metal having an atomic weight between that of thallium and that of bismuth inclusive, to form one or more of the desired azoxy, azo, hydrazo, and amino compounds.

3. The process of producing azoxy, azo, hydrazo, and amino compounds, which consists in subjecting a nitro compound in the gaseous state and mixed with gas containing hydrogen to the action of a heated catalyst containing finely divided lead, to form one or more of the desired azoxy, azo, hydrazo, and amino compounds.

4. The process of producing azoxy, azo, hydrazo, and amino compounds, which consists in subjecting a nitro compound in the gaseous state and mixed with hydrogen to the action of a heated catalyst containing finely divided lead, to form one or more of the desired azoxy, azo, hydrazo, and amino compounds.

5. The process of producing azoxy benzene, azobenzene, hydrazobenzene, and aniline (amidobenzol), which consists in subjecting nitrobenzene in the gaseous state and mixed with gas containing hydrogen to the action of a heated catalyst containing a finely divided metal having an atomic weight between that of thallium and that of bismuth inclusive, to form one or more of the desired products, azoxybenzene, azobenzene, hydrazobenzene, and aniline.

6. The process of producing azoxybenzene, azobenzene, hydrazobenzene, and aniline (amidobenzol), which consists in subjecting nitrobenzene in the gaseous state and mixed with hydrogen to the action of a heated catalyst containing a finely divided metal having an atomic weight between that of thallium and that of bismuth inclusive, to form one or more of the desired products, azoxybenzene, azobenzene, hydrazobenzene, and aniline.

7. The process of producing azoxybenzene, azobenzene, hydrazobenzene, and aniline (amidobenzol), which consists in subjecting nitrobenzene in the gaseous state and mixed with gas containing hydrogen to the action of heated catalyst containing a finely divided lead, to form one or more of the desired products, azoxybenzene, azobenzene, hydrazobenzene, and aniline.

8. The process of producing azoxybenzene, azobenzene, hydrazobenzene, and aniline (amidobenzol), which consists in subjecting nitrobenzene in the gaseous state and mixed with hydrogen to the action of a heated catalyst containing finely divided lead, to form one or more of the desired products, azoxybenzene, azobenzene, hydrazobenzene, and aniline.

9. The process of producing azoxy, azo, hydrazo, and amino compounds as set forth in claim 1, with the addition that the temperature to which the catalyst is heated during the process is between 200° and 360° C.

10. The process of producing azoxy, azo, hydrazo, and amino compounds as set forth in claim 2, with the addition that the temperature to which the catalyst is heated during the process is between 200° and 360° C.

11. The process of producing azoxy, azo, hydrazo, and amino compounds as set forth in claim 3, with the addition that the temperature to which the catalyst is heated during the process is between 200° and 360° C.

12. The process of producing azoxy, azo, hydrazo, and amino compounds as set forth in claim 4, with the addition that the temperature to which the catalyst is heated during the process is between 200° and 360° C.

13. The process of producing azoxybenzene, azobenzene, hydrazobenzene, and aniline (amidobenzol) as set forth in claim 5, with the addition that the temperature to which the catalyst is heated during the process is between 200° and 360° C.

14. The process of producing azoxybenzene, azobenzene, hydrazobenzene, and aniline (amidobenzol) as set forth in claim 6, with the addition that the temperature to which the catalyst is heated during the process is between 200° and 360° C.

15. The process of producing azoxybenzene, azobenzene, hydrazobenzene, and aniline (amidobenzol) as set forth in claim 7, with the addition that the temperature to which the catalyst is heated during the process is between 200° and 360° C.

16. The process of producing azoxybenzene, azobenzene, hydrazobenzene, and aniline (amidobenzol) as set forth in claim 8, with the addition that the temperature to which the catalyst is heated during the process is between 200° and 360° C.

In witness whereof, we have hereunto set our hands at Bloomington, Indiana, this 17th day of September, A. D. one thousand nine hundred and twenty one.

OLIVER W. BROWN.
CLYDE O. HENKE.